(12) United States Patent
Uhrner et al.

(10) Patent No.: US 8,398,088 B2
(45) Date of Patent: *Mar. 19, 2013

(54) SEALING RING

(75) Inventors: Klaus-Jürgen Uhrner, Leingarten (DE); Herbert Gust, Freiberg (DE)

(73) Assignee: KACO GmbH + Co. KG, Heilbronn (DE)

( * ) Notice: Subject to any disclaimer, the term of this patent is extended or adjusted under 35 U.S.C. 154(b) by 298 days.

This patent is subject to a terminal disclaimer.

(21) Appl. No.: 12/702,319

(22) Filed: Feb. 9, 2010

(65) Prior Publication Data

US 2010/0201077 A1  Aug. 12, 2010

(30) Foreign Application Priority Data

Feb. 9, 2009 (DE) .......................... 10 2009 009 002

(51) Int. Cl.
*F16J 15/32* (2006.01)

(52) U.S. Cl. ........................................ 277/559

(58) Field of Classification Search .................. 277/549, 277/551, 559
See application file for complete search history.

(56) References Cited

U.S. PATENT DOCUMENTS

| | | | | |
|---|---|---|---|---|
| 3,497,225 A * | 2/1970 | Workman | ...................... | 277/559 |
| 4,440,405 A * | 4/1984 | Schaus et al. | .................. | 277/559 |
| 4,739,998 A | 4/1988 | Steussloff | | |
| 5,039,112 A * | 8/1991 | Ulrich et al. | .................. | 277/562 |
| 5,271,629 A * | 12/1993 | Dahlhaus et al. | ............. | 277/559 |
| 5,791,658 A * | 8/1998 | Johnston | ........................ | 277/559 |
| 5,921,555 A * | 7/1999 | Johnston | ........................ | 277/559 |
| 6,715,768 B1 * | 4/2004 | Bock et al. | .................... | 277/559 |
| 6,860,486 B2 * | 3/2005 | Hacker et al. | .................. | 277/553 |
| 8,011,673 B2 * | 9/2011 | Berdichevsky | ............... | 277/553 |
| 8,181,971 B2 * | 5/2012 | Uhrner et al. | .................. | 277/559 |
| 2003/0085527 A1 | 5/2003 | Hacker et al. | | |
| 2004/0227304 A1 | 11/2004 | Kern et al. | | |
| 2009/0072489 A1 | 3/2009 | Uhrner et al. | | |

FOREIGN PATENT DOCUMENTS

| | | |
|---|---|---|
| DE | 102005030271 A1 | 1/2007 |
| EP | 0413895 A1 | 2/1991 |
| EP | 0561565 A1 | 3/1993 |
| GB | 2452843 | 3/2009 |

* cited by examiner

*Primary Examiner* — Vishal Patel

(74) *Attorney, Agent, or Firm* — Gudrun E. Huckett

(57) ABSTRACT

A sealing ring has a sealing element with at least one fastening part and at least one sealing part provided with a sealing edge. The sealing element is essentially of rotational symmetry. The sealing edge, at least over a portion of a circumference thereof, is positioned in a slanted position relative to a sealing ring axis at an angle different from a 90 degree angle, viewed in a projection onto an axial plane of the sealing ring. A support part is provided and the sealing edge is arranged on an inner side of the support part.

11 Claims, 2 Drawing Sheets

SEALING RING

BACKGROUND OF THE INVENTION

The invention relates to sealing ring that comprises a sealing element with at least one fastening part and at least one sealing part provided with a sealing edge, wherein the sealing element is essentially of rotational symmetry, and wherein the sealing edge, at least over a portion of a circumference thereof, is positioned in a slanted position relative to a sealing ring axis at an angle different from a 90 degree angle, viewed in a projection onto an axial plane of the sealing ring. In this way, a return action of the medium to be sealed that has passed underneath the sealing part is provided.

Such a sealing ring is disclosed in U.S. 2009/0072489 A1, the disclosure of which is incorporated by reference.

SUMMARY OF THE INVENTION

It is an object of the present invention to develop the sealing ring of the aforementioned kind in such a way that the return action of medium that has escaped from the medium chamber to be sealed is achieved in a more reliable way by simple constructive means.

In accordance with the present invention, this is achieved in that the sealing edge is provided on the inner side of a support part.

In the sealing ring according to the invention, the sealing edge is provided on a support part that reinforces the sealing edge so that in a mounted position of the sealing ring, the sealing edge rests with increased pressing force on the machine part to be sealed. In this way, an optimal sealing action and return action are achieved.

Advantageously, the support part is embodied as a ring. In this way, about the entire circumference of the sealing edge an excellent sealing action and return action are provided.

A simple embodiment is provided when the support part forms a monolithic part together with the sealing element.

In this connection, it is advantageous when the support part is formed by a tapering free edge section of the sealing element. In this way, the support part can be elastically bent without problems in the mounted position of the sealing ring.

In this case the sealing edge is preferably provided on a substantially radially extending shoulder that adjoins transversely the inner wall of the support part. With such a configuration, the sealing edge can be provided in a simple way on the sealing ring.

In another embodiment, the support part and the sealing element are separate parts. Such a configuration has the advantage that the two parts with respect to their respective function can be optimized, for example, with respect to the material from which they are made.

Preferably, the support part is attached to the sealing element, for example, by adhesive connection, weld connection or the like.

An excellent support action of the sealing edge in the mounted position of the sealing ring results when the support part with a free edge section projects axially past the sealing edge.

In order for the support part to be optimally matched to the sealing element, the support part tapers conically outwardly.

In order to obtain an excellent return action it is advantageous when the sealing edge has at least one axially projecting tongue that extends approximately to the level of the free end face of the support part.

This is advantageously enabled in that the end face of the support part is positioned in a plane that extends substantially radially relative to the sealing ring axis.

DESCRIPTION OF THE PREFERRED EMBODIMENTS

Figure 1:
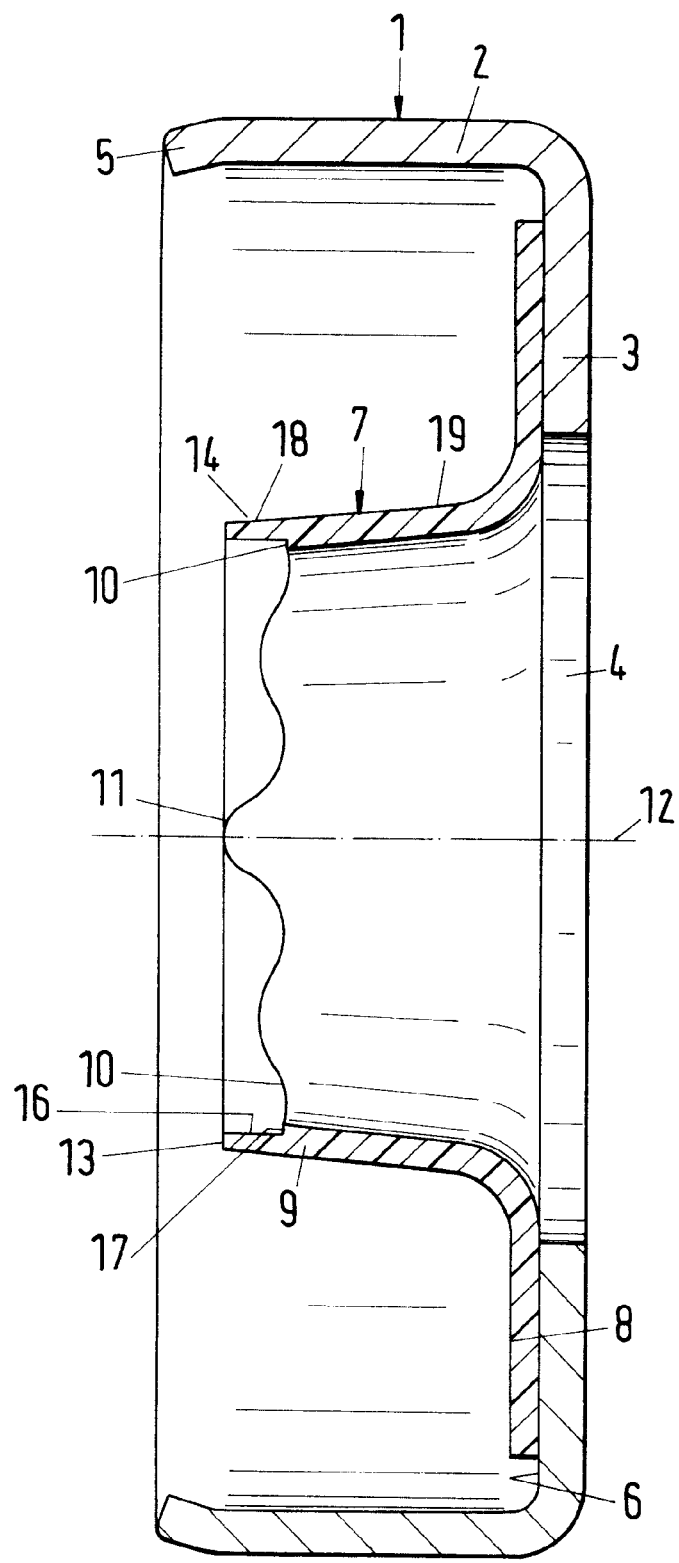
FIG. 1 is an axial section of a first embodiment of the sealing ring according to the invention.

The sealing ring according to FIG. 1 is of rotational symmetry and has a housing 1 that is comprised of metallic material or of a hard plastic material. The housing 1 has a cylindrical wall 2 that passes into a radially extending planar bottom 3. The cylinder wall 2 and the bottom 3 have advantageously the same thickness. The bottom 3 is provided centrally with a through opening 4 for a shaft (not illustrated) to be sealed. The free end 5 of the cylinder wall 2 can be angled inwardly.

On the inner side 6 of the bottom 3 a sealing element 7 is attached that may be comprised of any suitable material, for example, rubber or e.g. polytetrafluoroethylene. The sealing element 7 has an annular fastening part 8 that is attached to the inner side 6 of the housing bottom 3. The fastening part 8 passes into a sealing part 9 that is positioned on a tapering conical surface that tapers in the direction toward its free end and is resting with a sealing edge 10 seal-tightly against the shaft. The sealing edge 10 extends about the circumference of the sealing part 9 in a wavy or undulated shape. On at least one section of the circumference the sealing edge 10 is designed such that a projecting tongue 11 is formed. The section of the sealing edge 10 that delimits the tongue 11 has a smaller radius of curvature than the remaining sections of the sealing edge 10 forming the undulated contour.

With the housing 1 the sealing ring is mounted in an installation opening of a device or machine. With its cylindrical wall 2 the housing 1 is seated with press-fit in this installation opening. The sealing element 7 is resting with the undulated sealing edge 10 seal-tightly on the shaft. During use the shaft will rotate relative to the sealing element 7. The undulated sealing edge 10 ensures in this connection that a pumping action is generated that acts on the medium to be sealed and ensures that medium that has escaped from the medium chamber by passing underneath the sealing edge 10 will be returned into the medium chamber that is to be sealed. The tongue 11 is particularly effective in connection with this pumping action.

In deviation from the illustrated embodiment it is possible that the sealing edge 10 in the area outside of the tongue 11 is designed such that it is positioned in a radial plane of the sealing ring. In this way, the pumping action acting on the medium to be sealed is generated exclusively by the tongue 11. With an appropriate shaping of the tongue 11 the magnitude of the pumping action can be matched to the installation conditions and/or to the medium to be sealed.

It is advantageously when the sea ling edge 10 is formed symmetrical relative to the sealing ring axis 12. In this way, the pump action is identical in both possible rotary directions of the shaft or machine part.

For increasing the pressing force of the sealing edge 10 onto the shaft to be sealed, the sealing edge 10 is provided on a shoulder 17 that adjoins an inner side 16 of a tapering ring end section 14 of the sealing element 7. The ring end section 14 forms a support part that surrounds the sealing edge externally in the radial direction and in this way exerts a radial pressing force onto the sealing edge in the mounted position of the sealing ring. The support part 14 that is embodied as a support ring tapers outwardly in the radial direction and its outer side 18 forms a continuous extension of the exterior side 19 of the sealing element 7. The ring end section 14 projects only to a relatively small extent, in the embodiment about a fourth or a fifth of the axial extension of the sealing element 7, past the sealing edge of the sealing element 7. Advantageously, the tongue 11 extends to the level of the radial plane that contains the end face 13 of the support ring 14. As a result of the disclosed embodiment, the area between the sealing edge 10 and the end face 13 of the sealing element 7 or of its support ring 14 in the installed position has a spacing relative to the element to be sealed so that an excessive wear by friction is safely prevented.

Figure 2:
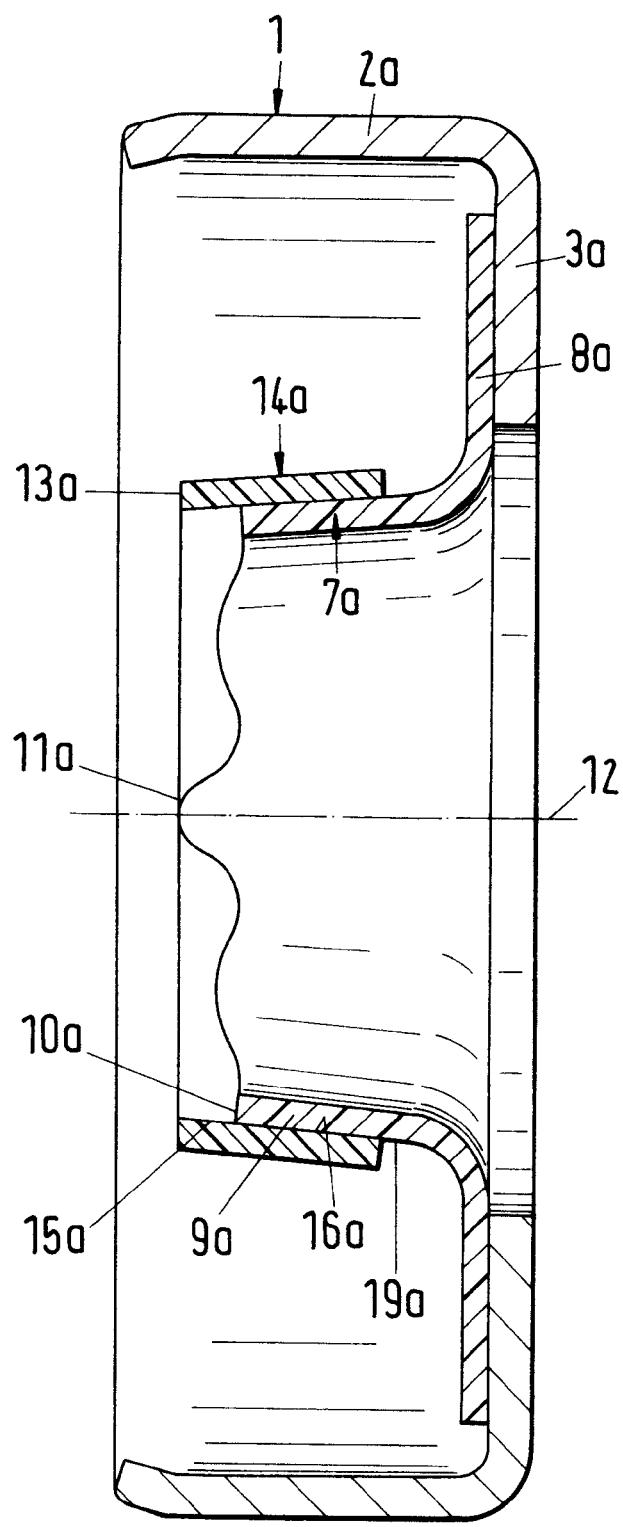
FIG. 2 is an axial section of a second embodiment of the sealing ring according to the invention.

The sealing ring according to FIG. 2 comprises housing 1 that is of the same configuration as in the afore described embodiment. The sealing element 7a has a fastening part 8a that is disk-shaped and passes into the sealing part 9a. The wave-shaped sealing edge 10a is provided on the end face of the sealing part 9a and is positioned, as a result of the undulated extension about sections of its length so as to deviate from 90 degrees relative to the sealing ring axis 12, when viewed in a protection onto an axial plane of the sealing ring. In the illustrated embodiment, this slant angle is approximately 80 degrees.

Instead of the tapering edge or end section of the sealing element 7 forming the support ring 14, in the instant embodiment of FIG. 2 a separate support ring 14a is provided that surrounds the sealing element 7a about a portion of its axial extension and extends axially past the sealing edge 10a. The support ring 14a projects in this embodiment with about one fourth of its height past the sealing edge+10a. As in the afore described embodiment, the tongue 11 a of the sealing edge 10a projects up to the level of the radial plane in which the end face 13a of the support ring 14a is positioned. By means of the support ring 14a, a pressing force is exerted onto the sealing edge 10a in the mounted position of the sealing ring so that a proper sealing action about the entire circumference of the machine part to be sealed is ensured. The support ring 14a can be adhesively attached to the sealing element 7a, can be fused or welded thereto or attached in a similar way. The area between the sealing edge 10a and the ring section 15a of the support ring 14a projecting past this edge 10a has also a spacing relative to the machine part to be sealed in order to prevent friction of the shaft or any other part to be sealed by the sealing ring 1. The support ring 14a has advantageously the same wall thickness across its axial length and is positioned with its inner side 16a at the exterior side 19a of the sealing element 7a.

The support ring 14a can be comprised of a material that is different from that of the sealing element 7a. In this way, it is possible to properly select the materials with regard to the respective tasks of sealing element 7a and the support ring 14a.

In other respects, the sealing ring according to FIG. 2 is of the same configuration as the sealing ring according to FIG. 1.

The specification incorporates by reference the entire disclosure of German priority document 10 2009 009 002.9 having a filing date of Feb. 9, 2009.

While specific embodiments of the invention have been shown and described in detail to illustrate the inventive principles, it will be understood that the invention may be embodied otherwise without departing from such principles.

What is claimed is:

1. A sealing ring comprising:
a sealing element comprising at least one fastening part and at least one sealing part provided with a sealing edge;
wherein the sealing element is essentially of rotational symmetry;
wherein the sealing edge, at least over a portion of a circumference thereof, is positioned in a slanted position relative to a sealing ring axis at an angle different from a 90 degree angle, viewed in a projection onto an axial plane of the sealing ring;
a support part, wherein the sealing edge is arranged on an inner side of the support part; wherein the support part projects axially past the sealing edge in an axial direction of the sealing ring axis away from the at least one fastening part;
wherein the sealing edge has an undulated shape with peaks and valleys extending axially;
wherein the sealing edge has at least one axially projecting tongue that extends past the peaks of the undulated shape in the axial direction and ends at a level of a free end face of the support part.

2. The sealing ring according to claim 1, wherein the support part is embodied as a ring.

3. The sealing ring according to claim 1, wherein the support part and the sealing element form a monolithic part.

4. The sealing ring according to claim 1, wherein the support part is formed by a tapering free end section of the sealing element.

5. The sealing ring according to claim 1, wherein the sealing edge is provided on a substantially radially extending shoulder that adjoins transversely the inner wall of the support part.

6. The sealing ring according to claim 1, wherein the support part and the sealing element are separate parts.

7. The sealing ring according to claim 6, wherein the support part is attached to the sealing element.

8. The sealing ring according to claim 6, wherein the support part is glued or welded to the sealing element.

9. The sealing ring according to claim 6, wherein the support part has a ring section projecting axially past the sealing edge.

10. The sealing ring according to claim 1, wherein the support part tapers conically.

11. The sealing ring according to claim 1, wherein the end face of the support part is positioned in a plane that is substantially radial to the sealing ring axis.

* * * * *